United States Patent [19]

Brüssel

[11] Patent Number: 4,995,933
[45] Date of Patent: Feb. 26, 1991

[54] METHOD OF PRODUCING MAT STRIPS FROM WIDE PANELS OF ADHESIVE MATERIAL COVERED WITH RELEASE LAYERS AND APPARATUS FOR IMPLEMENTING THE METHOD

[75] Inventor: Richard Brüssel, Sulzfeld, Fed. Rep. of Germany

[73] Assignee: Krupp Maschinentechnik GmbH, Essen, Fed. Rep. of Germany

[21] Appl. No.: 431,217

[22] Filed: Oct. 3, 1989

[30] Foreign Application Priority Data

Nov. 11, 1988 [DE] Fed. Rep. of Germany ....... 3838271

[51] Int. Cl.$^5$ .............................................. B32B 31/18
[52] U.S. Cl. ..................................... 156/247; 156/250; 156/259; 156/269; 156/271; 156/344; 156/510; 156/523; 156/538; 156/584; 83/47
[58] Field of Search ............... 156/62.2, 247, 250, 156/259, 269, 271, 291, 344, 510, 527, 538, 523, 543, 584; 83/39, 42, 47

[56] References Cited

U.S. PATENT DOCUMENTS

| | | |
|---|---|---|
| 3,734,814 | 5/1973 | Davis et al. .................... 156/510 |
| 4,110,151 | 8/1978 | Morse ............................. 156/538 |
| 4,362,585 | 12/1982 | de Antonis et al. ............ 156/62.2 |
| 4,662,973 | 5/1987 | Goton et al. ................... 156/247 |
| 4,880,488 | 11/1989 | Matso et al. ................... 156/584 |
| 4,897,148 | 1/1990 | Orlandi ........................... 156/510 |

Primary Examiner—Caleb Weston
Attorney, Agent, or Firm—Spencer & Frank

[57] ABSTRACT

The present invention relates to a method and an apparatus for producing mat strips from wide panels or sheets of an adhesive material covered with release layers by subdividing the panels of material in the longitudinal and transverse direcitons subsequent to removing the release layers.

In order to improve the economy and operational reliability of such methods and devices, the present invention includes gripping an end section of the sheet of material, from which the release layers have been removed, by means of gripping members and longitudinally subdividing the sheet during its movement in a first direction to form longitudinal strips, by actuating a longitudinal cutting member, and thereafter severing the longitudinal mat strips by actuation of a transverse cutting member.

9 Claims, 4 Drawing Sheets

METHOD OF PRODUCING MAT STRIPS FROM WIDE PANELS OF ADHESIVE MATERIAL COVERED WITH RELEASE LAYERS AND APPARATUS FOR IMPLEMENTING THE METHOD

CROSS REFERENCE TO RELATED APPLICATION

This application claims the priority of Federal Republic of Germany Application No. P 3838271.7 filed Nov. 11th, 1988 which is incorporated herein by reference.

BACKGROUND OF THE INVENTION

The present invention relates to a method of cutting mat strips from wide sheets or panels of adhesive material covered with release layers, particularly SMC resin mat panels, by removing the release layers immediately prior to the actuation of the cutting devices and by subdividing the panels of material in the longitudinal and transverse directions with cutting devices. The invention also relates to an apparatus for implementing the method.

The present invention is particularly applicable to what is referred to as SMC or sheet molding compound resin mat sheets or panels which, after being formed into strip stacks, also referred to as mat packets, (i.e., stacks of rectangular mat strips) can be processed into molded components by means of pressing or deforming tools.

The resin mat panels, of the type which are of particular interest here, are initially coiled or wound into rolls. Before such panels are processed into pressed components, the release layers must be removed and, in the normal case, the panels must be subdivided into rectangular mat strips.

In the prior art processes, a resin mat sheet is subdivided in the longitudinal and transverse directions without removing the release layers, thus forming mat strips. The release layers are then manually removed only when several mat strips are to be combined or stacked into mat packets. An automatic manufacturing process is also known in which the resin mat panel covered with release layers is subdivided longitudinally before it reaches a range of the feed device, which thereafter, feeds the panel to a release layer removal device. The drawback of such a method and the resulting structure is that the feed device is soiled by the escape of resin substance from the panels and, in addition, the later removal of the release layers from narrow mat strips poses considerable difficulties. Yet another problem with such a method and apparatus is that, under certain circumstances, the mat strips which are already separated from one another by a longitudinal cut may be unavoidably pressed against one another when passing through the feed device, with sufficient force such that they stick together again.

SUMMARY OF THE INVENTION

The apparatus of the present invention includes a feed device for advancing the panel of material sequentially to a clamping device, a device for removing the release layers, and thereafter to a cutting means for making longitudinal and transverse cuts, thus forming the mat strips, and ultimately to a transporting device on which the mat strips may be deposited.

It is an object of the present invention to provide a method and an apparatus which is cost effective and has a low susceptibility to malfunction, and which permits the manufacture of narrow mat strips from broader panels of an adhesive or resin material which are initially covered with release layers.

The present invention solves the aforementioned problems of the known prior art processes and apparatus by a method of producing narrow, rectangular mat strips from a wide sheet of adhesive material, such as a SMC resin mat sheet, which is covered with release layers, by subdividing the sheets of material in the longitudinal and transverse directions with cutting means and by removing the release layers prior to subdividing the sheet with the cutting means. This is advantageously accomplished by removing the release layers from an end section of the sheet of material, gripping the end section of the sheet with gripping members and moving the gripping members and the sheet material a predetermined longitudinal distance in a first direction corresponding to the desired length of the mat strip, removing the release layers from the sheet as the sheet is moved, subdividing the sheet with a longitudinal cutting means as the sheet is moved, clamping a portion of the sheet which is still covered with release layers, and thereafter severing the mat strips from the sheet, by actuating of a transverse cutting means.

The practicing of the present invention employs gripping members to feed the panels of material, from which the release layers have already been removed, into the range of influence of a longitudinal cutting means, to cut the panel into a plurality of longitudinal strips, and, while holding the material, to sever the resulting strips from the panel by the actuation of a transverse cutting means so as to obtain the desired length dimension of the mat strips. In contrast to the prior art, the two cutting processes are thus performed after the release layers have been removed from the panel of material. The gripping members only grip and move the uncovered end section of the panel of adhesive material.

Preferably, the method of the present invention is performed such that the longitudinal cutting means provides at least partial cutting movement in a direction opposite to the direction in which the gripping members move the panels. This manner of proceeding causes the longitudinal cutting device to operate at a high cutting velocity and thus permits a clean cut of the panel of material.

The method of performing a cutting movement in a direction opposite to the direction of transporting the panels may be accomplished, in particular, so that the longitudinal cutting means is brought into engagement with the panel of material by way of a pivoting movement.

In order to ensure that the gripping members will be able to properly grip the end section of the panel of material, the present invention provides for a pivoting movement of the open gripping members, relative to the plane of the panel of material, before the gripping members approach the end section of the panel.

An apparatus suitable for the production of narrow mat strips, and thus to implement the method of the present invention, includes a feed means for advancing the sheet of material to a cutting means for longitudinal and transverse cutting of the sheet, a device for removing the release layers, a device for clamping the sheet of material, and a transporting member onto which the longitudinally and transversely cut mat strips can be deposited. The present invention further includes positioning the clamping device intermediate the feed device and the cutting means, and positioning the release layer removing device intermediate the clamping device and the cutting means, and a plurality of gripping members mounted for movement relative to a guide track for gripping an end section of the sheet which freely extends from the clamping device toward the cutting means. The gripping members advance the sheet in a first direction relative to the cutting means, and the cutting means are moved in a direction opposite to the first direction.

Other significant features of the present invention include tong-shaped gripping members by which the panels of material are gripped at their free end sections and moved into the effective range of the longitudinal cutting means. Depending on the number of mat strips to be produced, the longitudinal cutting device includes one or a plurality of blades. If one blade is employed, the panel of material is divided into two mat strips; if two blades are employed the panel of material is divided into three mat strips, etc.

The movement of the gripping members is accomplished by mounting the gripping members in a carriage which is movable back and forth (i.e., longitudinally) along a guide track.

To improve the operational reliability of the gripping members, the section of the guide track facing the clamping device is held so as to be pivotal.

In another advantageous embodiment of the invention, the gripping members are pivotally mounted relative to the carriage and can be retained in different pivoted positions by way of a pivot drive.

The apparatus may be further modified so that at least one blade of the longitudinal cutting means is held by a pivot arm to be pivotable below the plane of the panel of material, with a pivot drive engaging the pivot arm for pivoting the longitudinal cutting means.

By appropriate actuation of the pivot drive, any desired blade of the longitudinal cutting means may be pivoted at great speed into the region of the panel of material, thus producing a favorably high cutting rate.

BRIEF DESCRIPTION OF THE DRAWINGS

The various features, benefits and advantages of the present invention will become more readily apparent upon reading the following description of the invention with reference to the drawings.

DETAILED DESCRIPTION OF THE INVENTION

Figure 1:
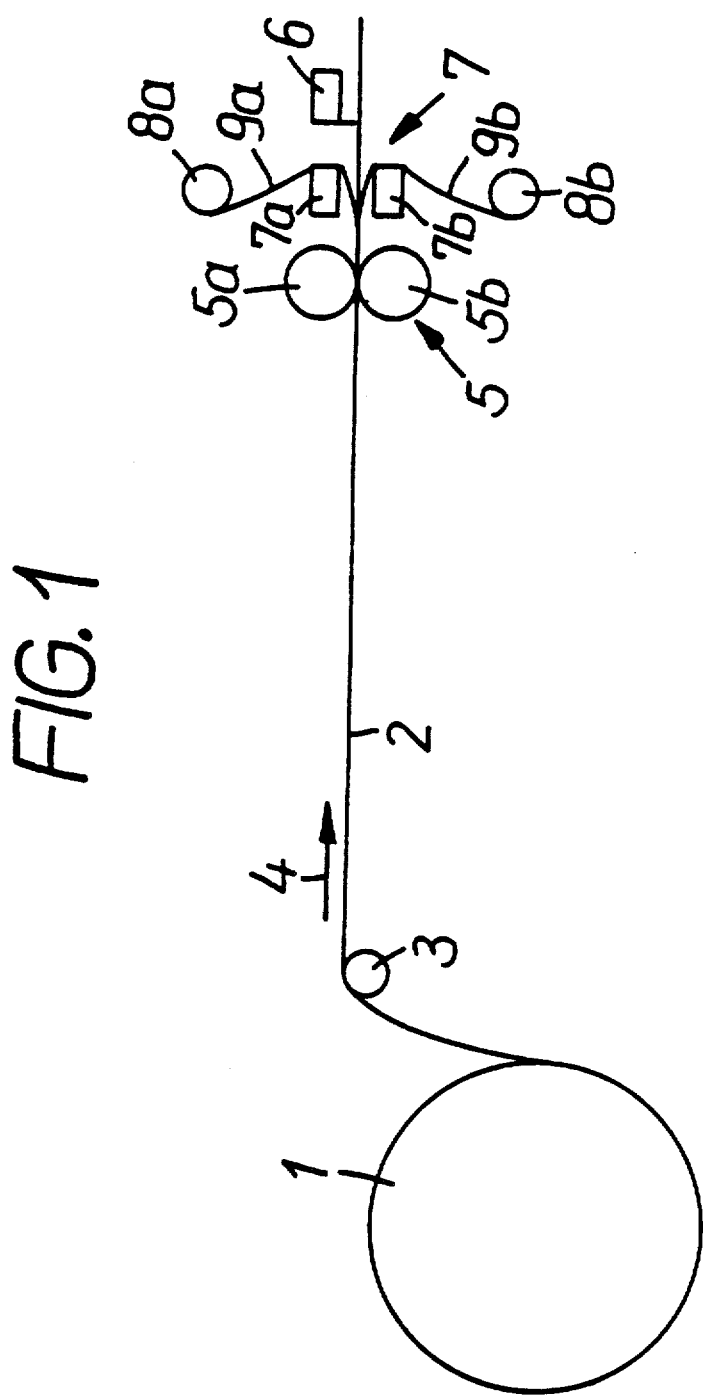
FIG. 1 is a schematic elevation representation of a portion of the structure of the present invention for producing mat strips up to the transverse cutting means.

As shown in FIG. 1, an SMC resin mat panel or sheet 2 is unwound from a coil 1 around a guide roller 3 in the direction of an arrow 4. The panel 2, which is in a generally horizontal plane, is then transported by means of a feed device 5 including feed rollers 5a and 5b positioned on opposite sides of the panel, to a transverse cutting means 6 which can subdivide the panel of adhesive resin material in the transverse direction. Cutting the panel in the transverse direction determines the length of the longitudinal strips.

A clamping device 7 having height-adjustable opposed clamping jaws 7a and 7b, is disposed between feed device 5 and the transverse cutting means 6. A release layer removal device, including removal rollers 8a and 8b on opposite sides of the panel 2, is disposed between the clamping device 7 and the transverse cutting means 6. The release layer removal device serves to remove the upper and lower release layers 9a and 9b, from resin mat panel 2 toward the top and bottom, respectively. The clamping jaws 7a and 7b are in an open position during the forward movement of resin mat panel 2 in the direction of arrow 4. Thus, the present invention operates such that the adhesive of the resin mat panel 2 is not in contact with the clamping device. The adhesive external surfaces of the panel are exposed only after release layers 9a and 9b have been removed. During the cutting processes to be described below, the forward movement of resin mat panel 2, to the right in the Figures, is interrupted and clamping device 7 moves into a closed position in which the resin mat panel 2 and also the release layers are held between the clamping jaws 7a and 7b.

Transverse cutting means 6, which has a blade 6a, is followed, in the direction of movement of resin mat panel 2, by a longitudinal cutting means 10. Depending on the desired number of resin mat strips to be produced, the longitudinal cutting means is provided with one or more such blades 10a.

Each blade 10a is held in a pivot arm 10c mounted at one end which arm is pivotal about a stationary axis 10b which is disposed underneath the plane of the panel of material. Pivot arm 10c can be moved back and forth by means of a pivot drive in the form of a cylinder assembly 10d attached to the pivot arm. The longitudinal cutting means 10 is mounted such that each blade 10a, when pivoted from the bottom into the range of resin mat panel 2, is able to perform a cutting movement in the longitudinal direction of the resin mat panel opposite to the forward movement of the panel, in the direction of arrow 4, by being pivoted from the bottom into cutting engagement with the resin mat panel 2. In the drawing, the cutting movement is produced by counterclockwise movement of pivot arm 10c.

The present invention further includes a plurality of tong-like gripping members 11 which are pivotally fastened about pivot point 15 to a carriage 12 which carriage can be moved along a guide track 13 in a first direction toward clamping device 7 until the gripping members are able to grip and retain an end section 2a of the panel which projects to the right or outwardly beyond clamping jaws 7a and 7b. This end section 2a, from which the release layers have been removed, extends from the release layer removal device to the effective range of transverse blade 6a.

The operation of the present invention and specifically the subdivision of the resin mat panel by cuts in the longitudinal and transverse direction will now be described.

After closing of clamping device 7, the open gripping members 11 are moved along guide track 13 toward the free end section 2a of resin mat panel 2. Cutting means 6 and 10 are each moved into a rest position out of engagement with the panel, with transverse blade 6a pivoted upwardly and the at least one blade 10a pivoted back in the direction toward cylinder assembly 10d.

Figure 2:
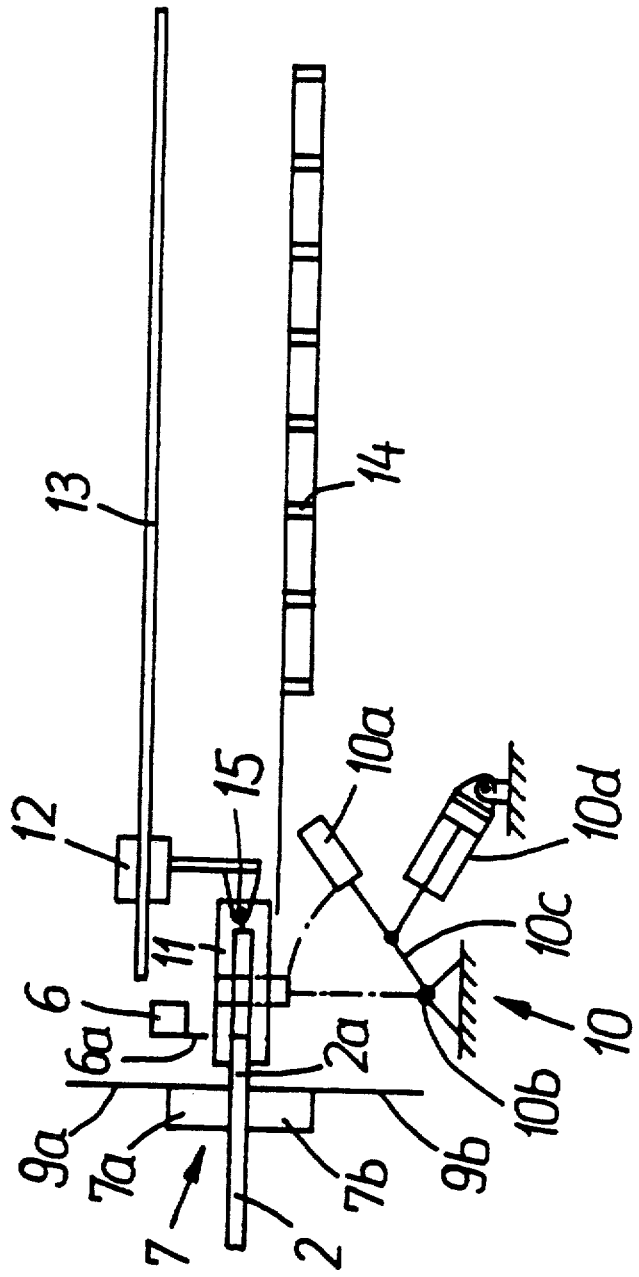
FIG. 2 is a schematic elevation representation, to a larger scale compared to that of FIG. 1, to show a portion of the structure of the present invention subsequent to the clamping device which is also shown in FIG. 1.

After closing of gripping members 11 and opening clamping device 7, gripping members 11 are moved along guide track 13 by moving means (shown in FIG. 4) to the right, thus unwinding resin mat panel 2 from coil 1 while simultaneously removing the release layers 9a and 9b. Additionally, longitudinal cutting means 10 engages the mat panel by actuating the cylinder assembly 10d with the result that each blade 10a performs a cut past the moving gripping members 11 and thus subdivides the resin mat panel carried by the gripping members into several longitudinal mat strips 2b illustrated in FIG. 3. As soon as the resin mat panel, which has been subdivided longitudinally, produces mat strips of the desired length, the forward movement of resin mat panel 2 is interrupted in that movement of the gripping members 11 and the feed device 5 shown in FIGS. 1 and 2 are stopped and clamping device 7 is closed. Then, actuation of transverse cutting means 6 causes the resin mat panel 2 to be subdivided transversely at the desired length for the strips 2b. The transverse cut also forms the freely projecting end section 2a such that the panel may be gripped by gripping members 11 for the advancing of the panel and formation of a subsequent plurality of mat strips. Immediately after the conclusion of the transverse cutting process, gripping members 11 continue their carrying movement and carry the mat strips into the region of a rake-shaped transporting device 14, and the mat strips are deposited on the transporting device by opening of gripping members 11. If mat strips are already present on transporting device 14, the depositing of additional mat strips forms mat stacks, i.e., mat strips deposited one on top of the other.

The rake-shaped transporting device 14 is movable in the vertical as well as the horizontal direction and is thus able to feed the mat strips and mat stacks formed therefrom to a pressing tool for further processing.

The described embodiment and operation of longitudinal cutting device 10 advantageously functions in that each blade 10a engages and cuts the resin mat panel 2 at a high cutting speed so that accurate subdivision of the panel into mat strips may be achieved.

Figure 3:
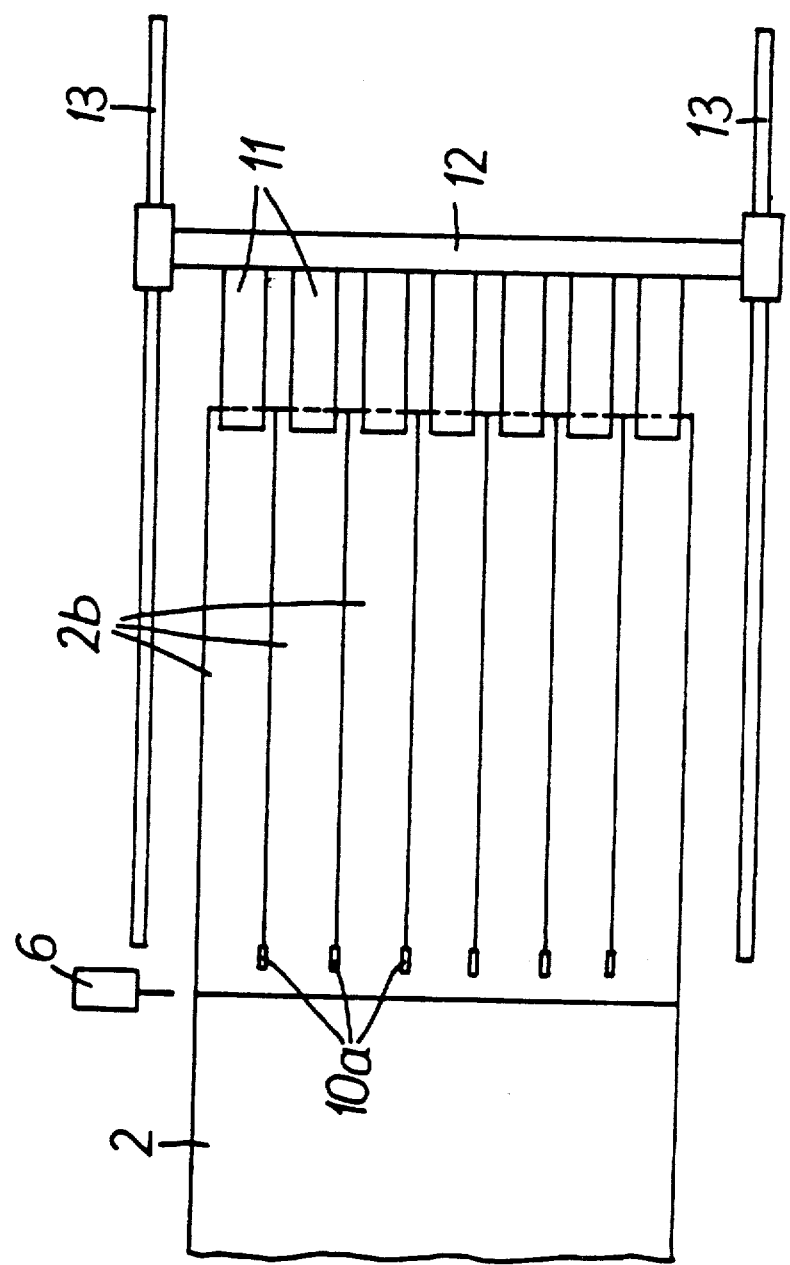
FIG. 3 is a top view of a resin mat panel that has been partially cut in the longitudinal direction, illustrating other portions of the structure of the present invention.

In the invention as illustrated in FIG. 3, the longitudinal cutting means is equipped with six blades 10a, and seven associated gripping members 11 corresponding to the number of mat strips 2b to be produced are fastened to a carriage 12. Thus, when the transverse cutting process by means of transverse cutting means 6 is completed, the adhesive resin panel 2 carried from the left to the right breaks up into seven mat strips 2b which can be deposited side-by-side on a transporting device 14 shown in FIG. 2.

Preferably, the transverse cutting process is performed with blades 10a still pivoted up into the region of resin mat panel 2, thus preventing lateral displacement of mat strips 2b. After cutting the strips, blades 10a are withdrawn or pivoted downwardly toward pivot 10d into a position which does not interfere with the transverse cutting process.

Figure 4:
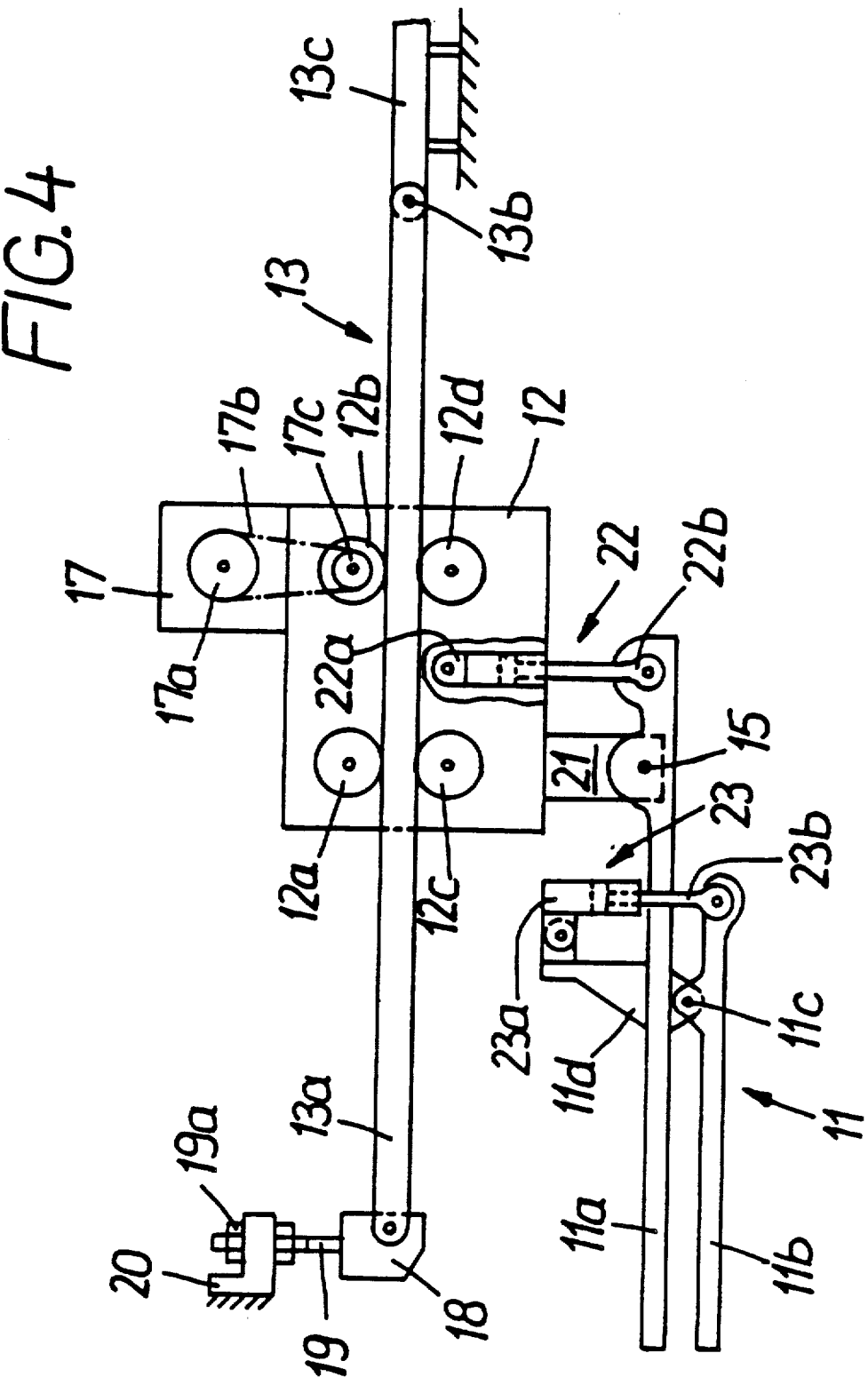
FIG. 4 is a schematic elevation of a gripping member which is pivotally mounted relative to a carriage and includes a pivot drive, the carriage being mounted for reciprocating movement along a partially pivotal guide track.

As shown in FIG. 4, the carriage 12 for the tong-like gripping members 11 is supported at either end (of FIG. 2) on the guide track 13 via upper guide rollers 12a and 12b and lower guide rollers 12c and 12d.

Movement of the carriage 12 and the gripper members 11 attached thereto is caused by a drive motor 17 whose direction of rotation can be reversed and which moves the guide roller 12b via a toothed pulley 17a, an endless toothed belt 17b and a toothed pulley 17c. If for example the drive motor 17 is rotating in clockwise direction the carriage 12 performs a movement towards the right along the guide track 13.

The guide track (and its components on either side of the carriage 12; cf FIG. 3) has on the side facing the clamping device 7, i.e. on the left in FIG. 4, a pivot section 13a, which is connected to a stationary guide track section 13c by a pivot joint 13b. The pivot section 13a is further secured by a rotary bracket 18 to a threaded bolt 19; the latter in turn rests on a stationary support 20 via adjusting nuts 19a.

By actuation of the adjusting nuts 19a the position of the threaded bolt 19 relative to the support 20 and hence the orientation of the pivot section 13a relative to a horizontal plane can be changed and then secured. In this way it is thus possible to adapt the position of the guide track 13 and the gripping members 11 to positional deviations in the region of the SMC resin mat panel 2 (cf FIGS. 1 and 2). In order to be able where necessary to change the orientation of the pivot section 13a of the guide track under remote control, the object of the invention may have an adjustment drive instead of parts 19 and 19a. This may consist in particular of a cylinder assembly which is articulated at one end to the pivot section 13a or the rotary bracket 18 and at the other end to the support 20.

In the case of the embodiment under discussion the gripper members 11 are pivotable relative to the carriage 12 and securable in different pivot positions in that the upper gripping arm 11a in each case is supported pivotally on a support member 21 below the carriage 12 via the aforementioned pivot point 15 and is also connected with a swivel drive in the form of a cylinder assembly 22. The latter is joined via its cylinder housing 22a to the carriage 12 and via its piston rod 22b to the gripping arm 11a. For example, the outward motion of the cylinder assembly 22 (i.e. the downward movement of the piston rod 22b relative to the carriage 12) results in the gripping member 11 performing a swivelling movement in clockwise direction around the pivot point 15.

The connection between the gripping arm 11a and the associated lower gripping arm 11b is formed by a rotary joint 11c. The opening and closing movements of the two gripping arms are caused by actuation of a gripping drive in the form of a cylinder assembly 23; the latter's cylinder housing 23a and piston rod 23b are fastened pivotally to a support 11d of the gripping arm 11a and to the lower gripping arm 11b, respectively. If the cylinder assembly 23 is extended, i.e. the piston rod 23b is moved downward, this results in the gripping arm 11b being swivelled in a clockwise direction relative to gripping arm 11a, i.e. the gripping member 11 performs a closing movement.

The embodiment described has the advantage that the pivoting of a part of the guide track 13 and the gripping members 11 permits fine adjustment to different or varying operating conditions.

The gripping arms 11a and 11b of the gripping members 11 are designed on their internal side facing the end section 2a (cf FIG. 2) in such a way as to reduce the adhesive effect of the sticky SMC resin mat panel 2. This can be effected in particular by providing the gripping arms at least in the region coming into contact with the end section 2a with an adhesion-reducing coating, in particular of PTFE (polytetrafluorethylene).

In a departure from the embodiment shown in FIG. 4 the object of the invention may also take the following form:

The in itself rigid guide track 13 is curved downwards arc-like on the side facing the clamping device 7 (of FIG. 1) and exhibits in cross section the form of a horizontal U in which the carriage 12 of the clamping members 11 is movably supported via only two guide rollers.

Moreover instead of the drive motor 17 a cylinder assembly acting on the carriage 12—in particular a pneumatic cylinder—may be used, whose action allows the carriage to be shifted towards the clamping device 7 (of FIG. 1).

One advantage achieved with the present invention is, in particular, that several mat strips can be produced directly from one resin mat panel from which the release layers have been removed and these mat strips can be assembled in a simple manner into several mat stacks by depositing them on top of one another on a transporting device.

It will be understood that the above description of the present invention is susceptible to various modifications, changes and adaptations, and the same are intended to be comprehended within the meaning and range of equivalents of the appended claims.

What is claimed is:

1. A method of producing strips from an adhesive sheet covered with release layers on opposite sheet faces, comprising the cyclical steps of
    (a) holding a leading end of the sheet with gripping members;
    (b) longitudinally advancing the held sheet with the gripping members an incremental distance corresponding to the desired length of the strips;
    (c) during the advancing step, longitudinally subdividing the sheet into said strips with a longitudinal cutting means;
    (d) during the advancing step, removing the release layers from the sheet with a removal device at a location situated upstream of the longitudinal cutting means, as viewed in the direction of the longitudinal sheet advance;
    (e) upon completion of the advancing step, immobilizing the sheet by clamping the sheet by a clamping device upstream of the longitudinal cutting means;
    (f) transversely severing the strips from the immobilized sheet with a transverse cutting means, whereby a new leading end of the sheet is obtained;
    the transverse severing step being performed downstream of said location; and
    (g) releasing the sheet from the clamping device.

2. A method as defined in claim 1, wherein at least a portion of the subdividing of the sheet with the longitudinal cutting means includes moving a cutting means in a direction opposite to the direction of the longitudinal sheet advance.

3. A method as defined in claim 2, wherein the longitudinal cutting means is pivotally moved into engagement with the advancing sheet.

4. A method as defined in claim 1 wherein the sheet of material is positioned in a generally horizontal plane and pivoting the gripping members relative to said plane prior to the step of gripping the end section of the sheet.

5. In an apparatus for producing strips from wide sheets of adhesive material covered on opposite faces with release layers, the apparatus comprising a cutting means for longitudinal and transverse cutting of the sheet, a release layer removal device, a clamping device for immobilizing the sheet of material during transverse cutting; wherein an end section of the sheet is defined as having the release layers removed therefrom, the improvement comprising:
    said clamping device, said release layer removal device and said cutting means being positioned sequentially;
    a plurality of gripping members for gripping the end section of the sheet and for incrementally advancing the sheet a distance corresponding to the desired length of the strip;
    said release layers being removed by the release layer removal device as the sheet is advanced; and
    means for moving said longitudinal cutting means in a direction opposite to the direction of advancing of the sheet to cut the sheet in plurality of longitudinal strips as the sheet is advanced;
    said transverse cutting means for cutting longitudinal strips from the sheet.

6. An apparatus as defined in claim 5, wherein the gripping members are mounted to a carriage, the carriage being mounted for reciprocating movement along a guide track.

7. An apparatus as defined in claim 6, wherein a section of the guide track facing the clamping device is mounted for pivotal movement.

8. An apparatus as defined in claim 6, wherein the gripping members are pivotally mounted relative to the carriage and including a pivot drive for retaining the gripping members in different pivoted positions.

9. An apparatus as defined in claim 5, wherein the sheet of material is in a first plane and the longitudinal cutting means includes at least one blade pivotally mounted by a pivot arm about an axis disposed below the plane of the sheet of material, the longitudinal cutting means further including a pivoting drive engaging said pivot arm.

* * * * *

UNITED STATES PATENT AND TRADEMARK OFFICE
CERTIFICATE OF CORRECTION

PATENT NO. : 4,995,933
DATED : February 26th, 1991
INVENTOR(S) : Richard Brüssel It is certified that error appears in the above-identified patent and that said Letters Patent is hereby corrected as shown below:

On the title page, under item [22]:
The filing date should read --Nov. 3, 1989--.

Signed and Sealed this

Thirtieth Day of June, 1992

Attest:

DOUGLAS B. COMER

*Attesting Officer*   Acting Commissioner of Patents and Trademarks